US009896177B1

(12) United States Patent
Tuchscherer et al.

(10) Patent No.: US 9,896,177 B1
(45) Date of Patent: Feb. 20, 2018

(54) SHIFT SYSTEM FOR A MARINE DRIVE (71) Applicant: Brunswick Corporation, Lake Forest, IL (US)

(72) Inventors: Andrew Tuchscherer, Wauwatosa, WI (US); Wayne M. Jaszewski, Jackson, WI (US); Theodore J. Hanes, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 547 days.

(21) Appl. No.: 14/692,178

(22) Filed: Apr. 21, 2015

Related U.S. Application Data (63) Continuation-in-part of application No. 14/627,323, filed on Feb. 20, 2015, now Pat. No. 9,731,804.

(51) Int. Cl.
B63H 20/20 (2006.01)
B63H 21/14 (2006.01)
F16H 61/32 (2006.01)
F16H 19/00 (2006.01)
B63H 23/06 (2006.01)

(52) U.S. Cl.
CPC ............. B63H 21/14 (2013.01); B63H 23/06 (2013.01); F16H 19/001 (2013.01); F16H 61/32 (2013.01); B63H 20/20 (2013.01); F16H 2061/326 (2013.01)

(58) Field of Classification Search
CPC .................................. B63H 20/14; B63H 20/20
See application file for complete search history.

(56) References Cited

U.S. PATENT DOCUMENTS

| 3,608,684 | A |   | 9/1971 | Shimanckas |
| 3,994,254 | A |   | 11/1976 | Woodfill |
| 4,173,939 | A |   | 11/1979 | Strang |
| 4,223,773 | A |   | 9/1980 | Croisant et al. |
| 4,302,196 | A |   | 11/1981 | Blanchard |
| 4,323,354 | A |   | 4/1982 | Blanchard |
| 4,331,432 | A |   | 5/1982 | Blanchard |
| 4,343,612 | A |   | 8/1982 | Blanchard |
| 4,986,774 | A |   | 1/1991 | Wantz |
| 5,449,306 | A |   | 9/1995 | Nakayasu et al. |
| 5,494,466 | A |   | 2/1996 | Vernea |
| 6,112,873 | A |   | 9/2000 | Prasse et al. |
| 6,346,017 | B1 | * | 2/2002 | Silorey .................. B63H 5/125 440/112 |

(Continued)

Primary Examiner — Andrew Polay
(74) Attorney, Agent, or Firm — Andrus Intellectual Property Law, LLP (57) ABSTRACT A marine drive comprises an internal combustion engine that effectuates rotation of the driveshaft, a propulsor driven into rotation by the driveshaft so as to effect thrust, and a transmission that shifts amongst a forward gear, a reverse gear, and a neutral gear. The marine drive has a gear case housing on the bottom portion and a driveshaft housing around the driveshaft and positioned between the internal combustion engine and the gear case housing. The marine drive has a shift rod rotatable about its own axis, wherein rotation of the shift rod about its own axis shifts the transmission amongst the forward gear, the reverse gear, and the neutral gear. The marine drive also comprises an actuator positioned in the driveshaft housing that effectuates the rotation of the shift drive about its own axis.

20 Claims, 10 Drawing Sheets (56) References Cited

U.S. PATENT DOCUMENTS

| | | |
|---|---|---|
| 6,544,083 B1 | 4/2003 | Sawyer et al. |
| 6,905,382 B2 | 6/2005 | Ochiai et al. |
| 6,929,518 B1 | 8/2005 | Sawyer et al. |
| 6,960,107 B1 | 11/2005 | Schaub et al. |
| 7,419,413 B2 | 9/2008 | Mizuguchi et al. |
| 7,435,146 B2 | 10/2008 | Oguma |
| 7,470,162 B2 | 12/2008 | Miyashita et al. |
| 7,891,263 B2 | 2/2011 | Mowbray et al. |
| 8,303,359 B2 | 11/2012 | Matsuda et al. |
| 2003/0224672 A1* | 12/2003 | Takada ............... B63H 20/20 440/75 |
| 2005/0014427 A1 | 1/2005 | Yoda et al. |
| 2007/0125192 A1 | 6/2007 | Mowbray et al. |
| 2014/0045393 A1 | 2/2014 | Kuriyagawa et al. |
| 2015/0004855 A1* | 1/2015 | Wiatrowski ......... B63H 20/20 440/75 |
| 2016/0137280 A1* | 5/2016 | Sugiyama ............ B63H 23/30 440/75 |

\* cited by examiner

SHIFT SYSTEM FOR A MARINE DRIVE

CROSS-REFERENCE TO RELATED APPLICATION(S)

This application is a continuation-in-pan of U.S. patent application Ser. No. 14/627,323, filed Feb. 20, 2015, which is incorporated herein by reference in entirety.

FIELD

The present disclosure relates to marine drive systems, and especially systems and apparatuses for shift actuation therein.

BACKGROUND

U.S. Pat. No. 3,608,684 describes a clutch for a marine propulsion device. The device affords reverse operation by rotation of the driveshaft housing about a vertical axis. It includes a clutch in the lower unit gear case for selectively engaging or disengaging the propeller shaft with the driveshaft. The clutch is responsive to axial movement of the driveshaft caused by moving a control handle accessible to the operator.

U.S. Pat. No. 3,994,254 discloses a multiple-speed transmission for coupling an engine to the impeller of a marine jet drive, such that an overdrive connection powers the jet drive under operating conditions up to a predetermined upper limit of cruising speeds and such that a reduced drive, for example a direct-drive connection, is automatically established for jet-drive speeds in excess of the cruising conditions.

U.S. Pat. No. 4,173,939 discloses a marine propulsion device that incorporates a two-speed transmission including a first drive gear which is mounted for common rotation with an input shaft drivingly connected to an engine and which meshes with a first driven gear mounted for rotation coaxially with a drive shaft drivingly connected to the propeller shaft and further including a second drive gear which is mounted for rotation coaxially with and independently of the input shaft and which meshes with a second driven gear mounted for common rotation with the drive shaft.

U.S. Pat. No. 4,223,773 discloses a drive engaging apparatus. A clutch apparatus for a marine drive lower gear case includes a propeller shaft rotatably mounted in a gear case housing. A drive gear for both forward and reverse is positioned in the housing coaxial with the propeller shaft and a clutch member is rotatably fixed on the propeller shaft and movable axially into drive engagement with the drive gear. Clutch engaging elements are provided on opposed portions of the drive gears and the clutch member. Shift means utilizing a positive acting cam means positively move the clutch member into and out of engagement from the drive gears. The shift means also include a releasable latch means to positively maintain the shift means in the engaged position and a preloading means between the shift means and the clutch member to snap the clutch member into engagement.

U.S. Pat. No. 4,302,196 describes a marine propulsion unit including propeller shaft thrust transmitting means. The marine propulsion device includes a driveshaft housing mounted for vertical swinging movement about a horizontal axis relative to a boat, a propeller shaft rotatably mounted in the driveshaft housing and having an axis of rotation, and a propeller carried by the propeller shaft. The marine propulsion device also includes a first bevel gear mounted in the driveshaft housing and in coaxial relation to the propeller shaft, a second bevel gear mounted in the driveshaft housing and in coaxial relation to the propeller shaft, and a clutch mechanism for selectively drivingly connecting the bevel gears to the propeller shaft.

U.S. Pat. No. 4,323,354 discloses a marine propulsion device that includes an input shaft drivingly connected to a power source, a lower unit having a rotatably mounted drive shaft extending in coaxial relation to the input shaft, and a propeller shaft rotatably mounted in the lower unit, the propeller shaft carrying a propeller. A two-speed transmission is provided to drivingly connect the input shaft to the drive shaft.

U.S. Pat. No. 4,331,432 discloses a marine propulsion device that includes an input shaft drivingly connected to a power source, a lower unit having a rotatably mounted drive shaft extending in coaxial relation to the input shaft, a rotatably mounted propeller shaft carrying a propeller and drivingly connected to the propeller shaft, and a two-speed transmission drivingly connecting the input shaft to the drive shaft.

U.S. Pat. No. 4,343,612 discloses an outboard motor that includes a power head having an engine, a propulsion leg extending downwardly from the power head, an input shaft housed in the propulsion leg and driven by the engine, a drive shaft housed in the propulsion leg, a propeller shaft in the propulsion leg and drivingly connected to the drive shaft, and a propeller mounted on the propeller shaft.

U.S. Pat. No. 4,986,774 discloses a desmodromic shift adaptor for a counter-rotating propeller shaft assembly. The adaptor member accommodates use of a desmodromic cam-actuated shifting mechanism. The adaptor member includes a cup, which is adapted to mount the fore one of the forward and reverse gears through a bearing member. The adaptor member further includes an internal passage within which is disposed the movable cam of the shifting mechanism, and an opening is in communication with the passage for allowing connection of the shift shaft to the shifting cam after assembly of the adapter member into the gear case cavity.

U.S. Pat. No. 5,449,306 describes a shifting mechanism for an outboard drive. It provides reduced coupling shock when the forward gears are engaged by a dual clutch assembly, as well as providing for consistent and quick engagement of the clutch assembly with the gear. The shifting mechanism involves a first gear and a corresponding first clutch, and a second gear and a corresponding second clutch. A plunger carries the first and second clutches which are arranged on the plunger at unequal distances from their respective gears.

U.S. Pat. No. 5,494,466 discloses a transmission for a single engine drive for dual concentric propellers in a straight or V-drive arrangement with the straight-drive including four shafts and nine gears and the V-drive adding two more shafts and four more gears.

U.S. Pat. No. 6,112,873 describes an anti-backlash dog type clutch. The clutch is provided for mounting on a rotatable shaft. The drive clutch includes a drive gear having a plurality of gear teeth projecting therefrom. A sleeve is slidably mounted on the shaft for rotational movement therewith. The sleeve includes a plurality of gear engaging recesses therein of arcuate lengths greater than the predetermined arcuate lengths of the gear teeth. The sleeve is movable between a first retracted position and a second engaged position wherein the gear teeth are received within corresponding gear engagement recesses in the sleeve in order to translate rotation of the drive gear to the shaft. A plurality of anti-backlash elements are provided to compensate for the difference in the arcuate lengths of the gear teeth and their corresponding gear engagement recesses in the sleeve.

U.S. Pat. No. 6,544,083 discloses a shift mechanism for a marine propulsion system. The mechanism is provided in which a cam structure comprises a protrusion that is shaped to extend into a channel formed in a cam follower structure. The cam follower structure can be provided with first and second channels that allow the protrusion of the cam to be extended into either channel which accommodates both port and starboard shifting mechanisms. The cam surface formed on the protrusion of the cam moves in contact with a selected cam follower surface formed in the selected one of two alternative channels to cause the cam follower to move axially and to cause a clutch member to engage with either a first or second drive gear.

U.S. Pat. No. 6,905,382 discloses a shift mechanism has a shift unit movable between a first shift position and a second shift position. The transmission moves to a first position while the shift unit moves toward the first shift position, and moves to a second position while the shift unit moves toward the second shift position. An electrically operable shift actuator is supported by the drive body. The shift actuator has an actuating member that preferably is detachably coupled with the shift unit.

U.S. Pat. No. 6,929,518 discloses a shifting apparatus for a propulsion device that incorporates a magneto-elastic elastic sensor which responds to torque exerted on the shift shaft of the gear shift mechanism. The torque on the shift shaft induces stress which changes the magnetic characteristics of the shift shaft material and, in turn, allows the magnetoelastic sensor to provide appropriate output signals representative of the torque exerted on the shift shaft. This allows a microprocessor to respond to the onset of a shifting procedure rather than having to wait for actual physical movement of the components of the shifting device.

U.S. Pat. No. 6,960,107 discloses a marine transmission with a cone clutch used for direct transfer of torque. A transmission for a marine propulsion system uses a cone clutch in such a way that, when in a forward gear position, torque is transmitted from the input shaft, or driving shaft, to an output shaft, or driven shaft, solely through the cone clutch. When in forward gear position, driving torque between the driving and driven shafts is not transmitted through any gear teeth. When in reverse gear position, torque is transmitted through an assembly of bevel gears.

U.S. Pat. No. 7,470,162 discloses a shift system for outboard motors, which was reduced in size and is capable of securing capability with an outboard motor of a type for which the shift operation is manually performing using a shift cable. A motor-driven shift actuator is disposed at a location forward of and to the right of an engine within. A clutch motor is provided for the actuator and disposed at a location rearward thereof, with a motor output shaft disposed in a manner extending forward, and is operated in response to the detected vessel operator's shift. An actuator output shaft is disposed at a location forward of the clutch motor and extends downward from a front part of the actuator. The actuator output shaft rotates in accordance with rotation of the motor output shaft. A clutch shaft is disposed below the actuator and rearward of the actuator output shaft. A first linkage is disposed on the right side of the actuator, as viewed in plan view, and connects between the actuator output shaft and the clutch shaft.

U.S. Pat. No. 7,891,263 discloses a shifting mechanism for an outboard drive of a watercraft. The shifting mechanism is located on a drive train generally aligned along a vertical axis and above a propulsion shaft of the lower unit. The drive train includes a rotatable input shaft which is driven by a motor.

U.S. Pat. No. 8,303,359 discloses an outboard motor that includes a transmission mechanism mounted between an output shaft of an engine and a propeller drive shaft. The transmission mechanism includes a clutch.

U.S. Patent Application Publication No. 2005/0014427 discloses a shift operation apparatus for an outboard motor comprising a worm gear which is rotated by the motor, a worm wheel that engages with the worm gear, an output shaft provided so as to freely rotate, a gear mechanism which transmits rotation of the worm wheel to the output shaft, an output arm which is attached to the output shaft, and which moves a range from a shift forward position to a shift reverse position with a neutral position being a boundary, a sensor which outputs a signal relating to a shift position of the output arm to a control circuit, and a force transmitting member whose one end is connected to the output arm, and whose other end is connected to a portion to be operated of a shift mechanism.

U.S. Patent Application Publication No. 2007/0125192 discloses a two speed transmission that includes an input shaft; a layshaft spaced from the input shaft; a first gear train connecting the input shaft to the layshaft; a second gear train connecting the layshaft to an output shaft the gear train including a one way clutch or similar; and a clutch for engaging the input shaft with the output shaft. The transmission is arranged such that when the output shaft is disengaged from the input shaft power is transmitted to the output shaft via the first and second gear trains and the layshaft.

U.S. Patent Application Publication No. 2014/0045393 discloses an outboard motor that is mounted on a stern of a boat and provided with a transmission and an oil pump. The transmission has a first-speed and second-speed gears, a first-speed gear clutch made of a mechanical dog clutch and a second-speed gear clutch made of a hydraulic clutch each adapted to engage the first and second-speed gears on a power transmission shaft, and a first-speed gear shift actuator adapted to couple the first-speed gear clutch with the first-speed gear. In the transmission, a first speed is established when the first-speed gear is engaged on the power transmission shaft and a second speed is established when the second-speed gear is engaged on the power transmission shaft while the first speed has been established such that power of the engine is transmitted to the propeller through the established speed.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a marine drive comprises an internal combustion engine that effectuates the rotation of the driveshaft, a propulsor driven into rotation by the driveshaft so as to effect thrust, and a transmission that shifts amongst a forward gear wherein the thrust is a forward trust, a reverse gear wherein the thrust is a reverse thrust, and a neutral gear wherein the thrust is a zero thrust. The marine drive also has a gear case housing on the bottom portion and a driveshaft housing around the driveshaft and positioned between the internal combustion engine and the gear case housing. The marine drive further comprises a shift rod rotatable about its own axis, wherein rotation of the shift rod about its own axis shifts the transmission amongst the forward gear, the reverse gear, and the neutral gear. The marine drive also comprises an actuator positioned in the driveshaft housing that effectuates the rotation of the shift rod about its own axis.

In another embodiment of a marine drive having a driveshaft housing and a gear case housing, a shift system includes a transmission that shifts amongst a forward gear wherein the thrust is a forward thrust, a reverse gear wherein the thrust is a reverse thrust, and a neutral gear wherein the thrust is a zero thrust. The shift system also includes a shift rod rotatable about its own axis to cause the transmission to shift amongst the forward gear, the reverse gear, and the neutral gear. The shift system also has an actuator motor positioned in the drive shaft housing that effectuates the rotation of the shift rod about its own axis.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
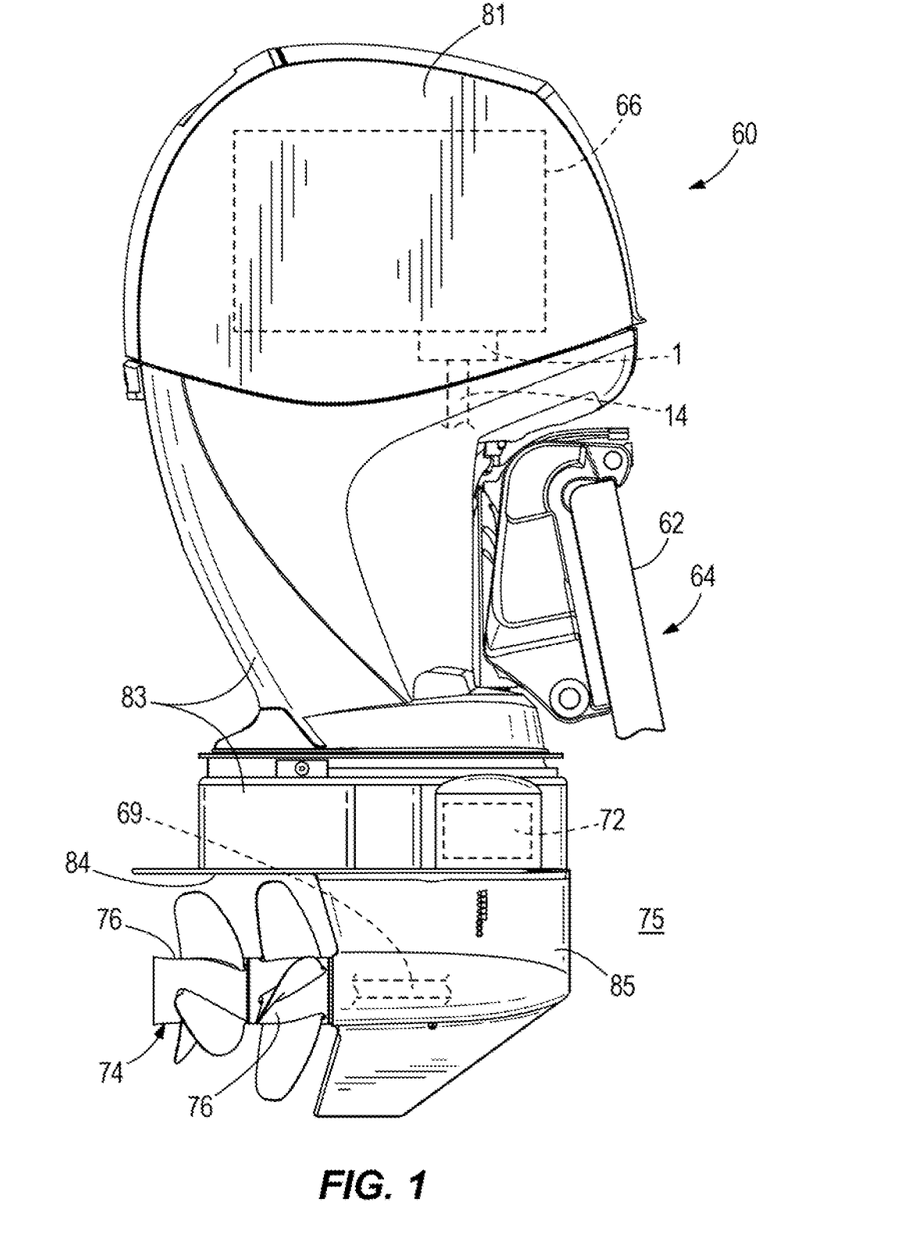
FIG. 1 is a side view of an outboard marine engine coupled to a marine vessel incorporating devices and systems of the present disclosure.
Figure 7:
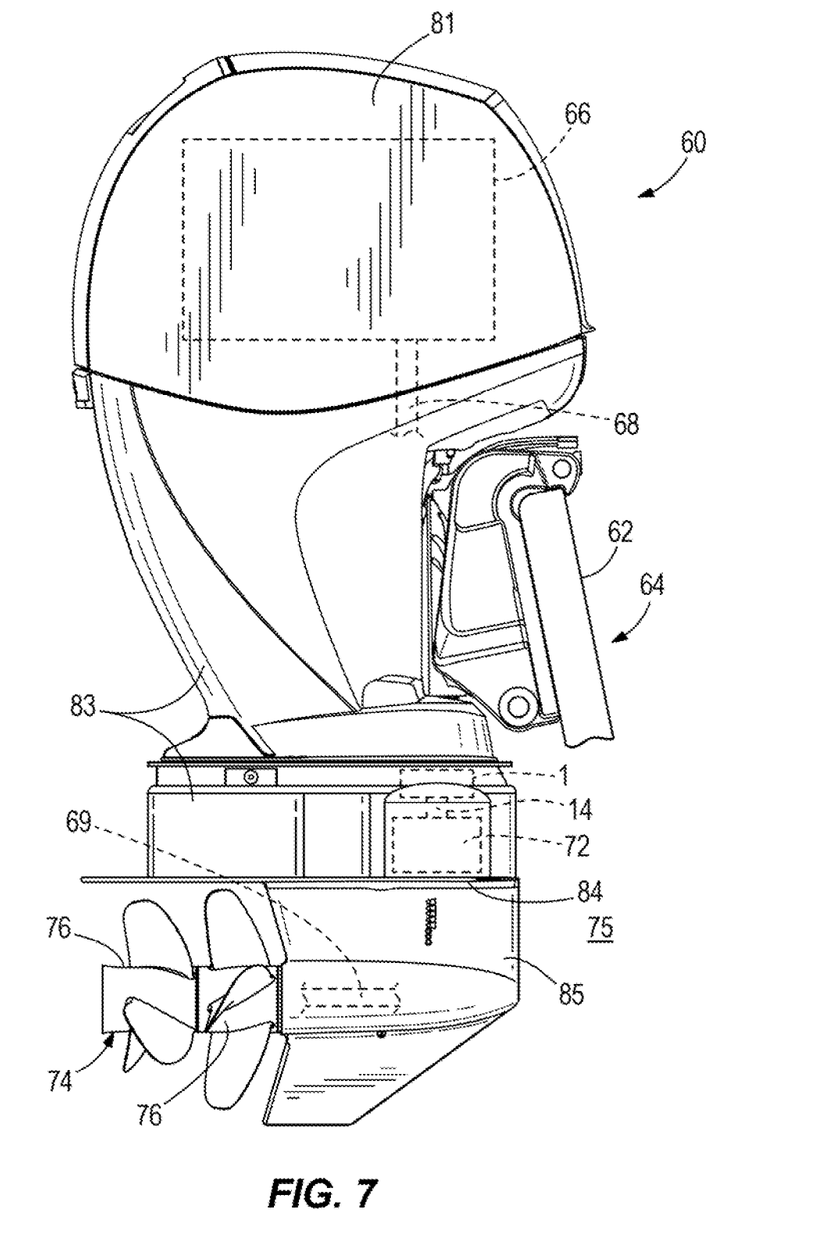
FIG. 7 depicts a side view of another embodiment of an outboard marine engine coupled to a marine vessel incorporating devices and systems of the present disclosure.
Figure 8:
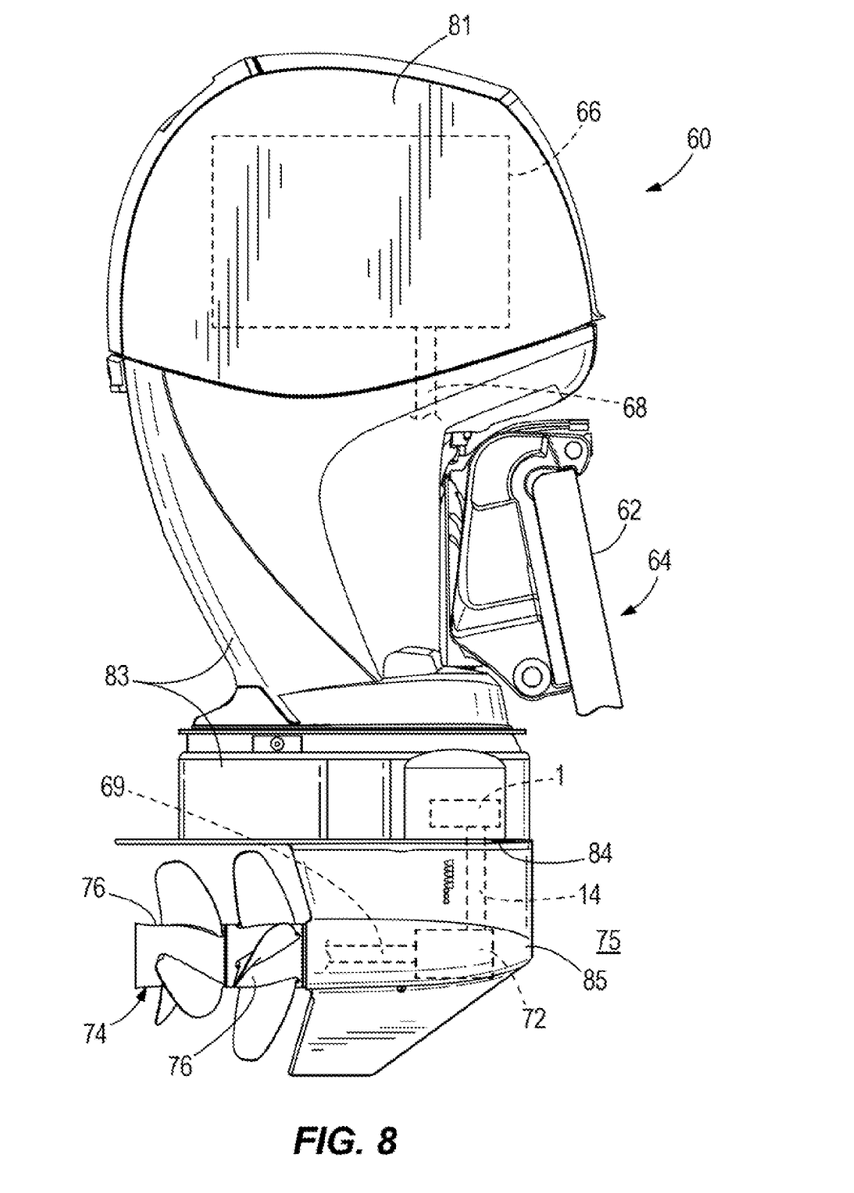
FIG. 8 depicts yet another embodiment of an outboard marine engine coupled to a marine vessel incorporating devices and systems of the present disclosure.

FIGS. 1, 7 and 8 depict an outboard marine engine 60 connected to a transom 62 of a marine vessel 64. The outboard marine engine 60 has an internal combustion engine 66 that causes rotation of a driveshaft 68 (shown in FIGS. 7 and 8). Rotation of the driveshaft 68 is transferred via transmission 72 to a propulsor shaft 69 located in driveshaft housing 83 or gear case housing 85. The transmission 72 is operable in Forward, Neutral, and Reverse gears. Rotation of a propulsor shaft 69 in Forward and Reverse gears causes forward and reverse rotation of a propulsor 74, respectively. In this example, the propulsor 74 includes counter rotating propellers 76. In alternate embodiments, the propulsor 74 can include a single propeller, more than two propellers, one or more impellers, and/or any other similar devices for creating thrust force in water 75 to propel marine vessel 64. The outboard marine engine 60 has a housing comprising an engine housing 81, a driveshaft housing 83, an anti-ventilation plate 84, and a gear case housing 85. The engine housing 81 extends over the top portion of the outboard marine engine 60, including over the internal combustion engine 66. Below the engine housing 81 is a driveshaft housing 83 that surrounds the driveshaft 68. Below the driveshaft housing 83 is the anti-ventilation plate 84, which is a plate extending horizontally above the gear case housing 85 and the propeller 76. The gear case housing 85 comprises the bottom portion of the outboard marine engine 60 from which the propulsor 74, such as one or more propellers 76, extends.

Marine drives sometimes utilize electrically driven shift actuation to reduce shift loads, enhance operator feel, and provide more consistent shifting. For example, currently available marine drives utilize linear or rotary actuators with actuator motors that are connected to or housed near the internal combustion engine that drives linkages and/or a shift rod that extends through the driveshaft housing 83 to the transmission 72, which may be housed in the lower portion of the shaft housing 83 or in the gear case 85. In the case of outboard marine engines, the shift actuation is often driven from an actuator motor inside the engine housing 81. In the case of stern drives, shift actuation is driven from an actuation motor within the boat, with linkages or cables extending out through the driveshaft housing 83 into the transmission 72.

Through experimentation and research regarding marine drives, and specifically shift systems for marine drives, the present inventors have recognized that presently available shift actuation systems are overly complicated involving multiple parts and linkages that are prone to failure, thus increasing the incidents of failure, maintenance requirements, and related costs of marine drives. Accordingly, the present inventors developed the shift actuation system 1 disclosed herein which is housed in the driveshaft housing 83 closer to the transmission 72. In one embodiment, the shift actuation system 1 has an improved design wherein the actuator motor is directly mounted to the shift rod 14 via one or more gear sets.

FIG. 1 depicts an outboard marine engine 60 configured in accordance with certain features, aspects, and advantages of the present invention. The outboard marine engine 60 is one type of marine drive, and the embodiments below are described in the context of an outboard marine engine. The embodiments, however, can be applied to other marine drives, such as inboard drives and inboard/outboard drives (or stern drives), as will be apparent to those of ordinary skill in the art.

Figure 2:
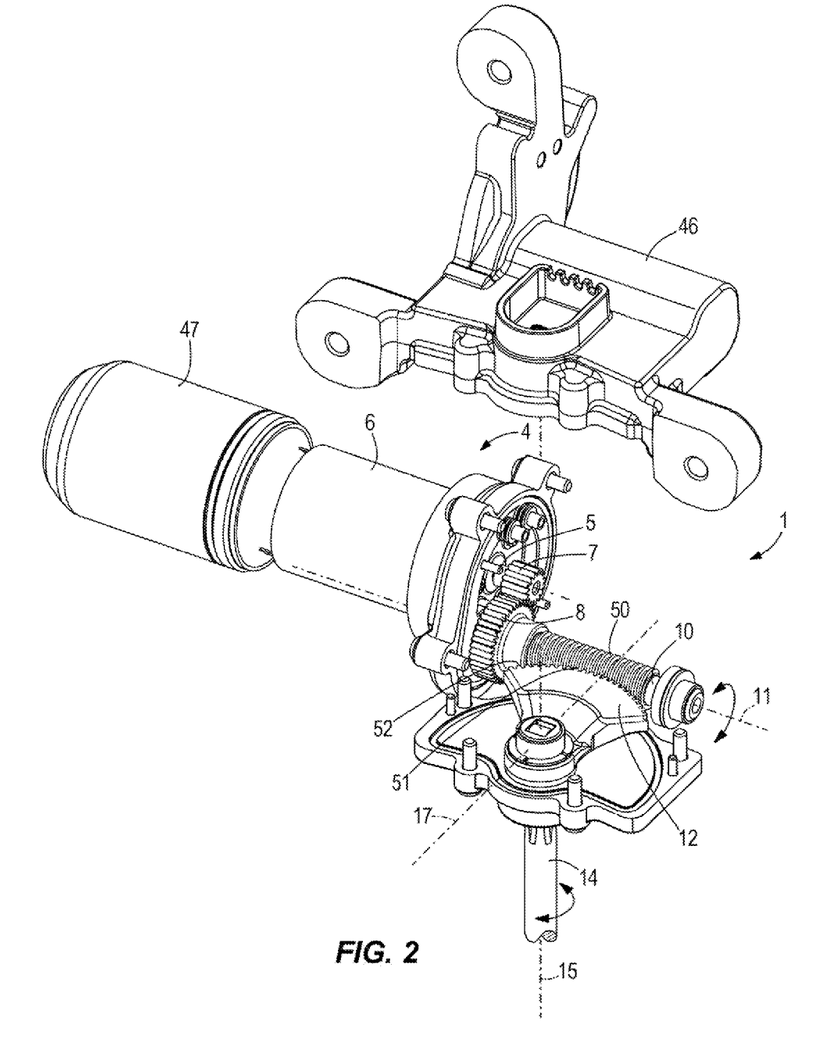
FIG. 2 depicts one embodiment of a shift actuation system for a marine drive.

FIG. 2 depicts one embodiment of a shift actuation system 1. The shift actuation system 1 operably connects to the internal combustion engine 66 and may be housed in housing 46, which mounts within the outboard marine engine 60. The shift actuation system 1 may be located within the engine compartment, or within the engine housing 81, and attached to the engine 66. Alternatively or additionally, brackets or adapters may provide operable connection between the internal combustion engine 66 and the shift actuation system 1. Thus, in some embodiments the shift actuation system 1, or parts thereof, may be located outside of the engine housing 81, such as in the driveshaft housing 83 or the gear case housing 85. An actuator 4 has a motor 6 that causes rotation of gear shaft 10. Actuator motor 6 may be any motor capable of rotating a shaft as described herein, such as an electric motor or air motor. The actuator motor 6 may be protected by a cover 47. In the embodiment of FIG. 2, motor 6 rotates output shaft 5 in order to effectuate rotation of gear shaft 10. Output shaft 5 is connected through a gearset, including a first gear 7 and a second gear 8, to gear shaft 10. The first gear 7 is fixed to output shaft 5 and the second gear 8 is connected to the gear shaft 10. Rotation of the first gear 7 by the output shaft 5 transfers rotational movement to the second gear 8 and causes rotation of the gear shaft 10. Rotation of the output shaft 5 in one rotational direction causes rotation of the gear shaft 10 in an opposite rotational direction. The first gear 7 and the second gear 8 are depicted in FIG. 2 as parallel axis spur gears. In other embodiments, the first gear 7 and the second gear 8 may be, for example, helical gears, bevel gears, or hypoid gears, and may have parallel or crossed axes. Likewise, the gearset connecting the output shaft 5 and the gear shaft 10 may comprise any number of gears.

Gear shaft 10 is positioned along a first axis 11 and rotates about that axis. Shift rod 14 is positioned along a second axis 15 and rotates about that axis. Gear shaft 10 is connected to shift rod 14 through a gearset such that rotation of gear shaft 10 causes rotation of shift rod 14. In the embodiment of FIG. 2, gear shaft 10 has worm 50 that engages sector gear 12, which is fixed to shift rod 14. Sector gear 12 has an arched surface 51. The arched surface 51 has teeth 52 thereon that mesh with the grooves in worm 50 such that rotation of the gear shaft 10 and worm 50 forces the sector gear 12 to rotate. Sector gear 12 is fixed to shift rod 14, which is rotatable about its own axis 15. Rotation of the shift rod 14 shifts the transmission 72 amongst a forward gear, a reverse gear, and a neutral gear. The shift rod 14 extends along a second axis 15 which runs perpendicular to the first axis 11. The shift rod 14 is spaced apart from the gear shaft 10 along a third axis 17. In this embodiment, the third axis 17, and thus the shift rod 14, is perpendicular to both the second axis 15 and the first axis 11.

Figure 3:
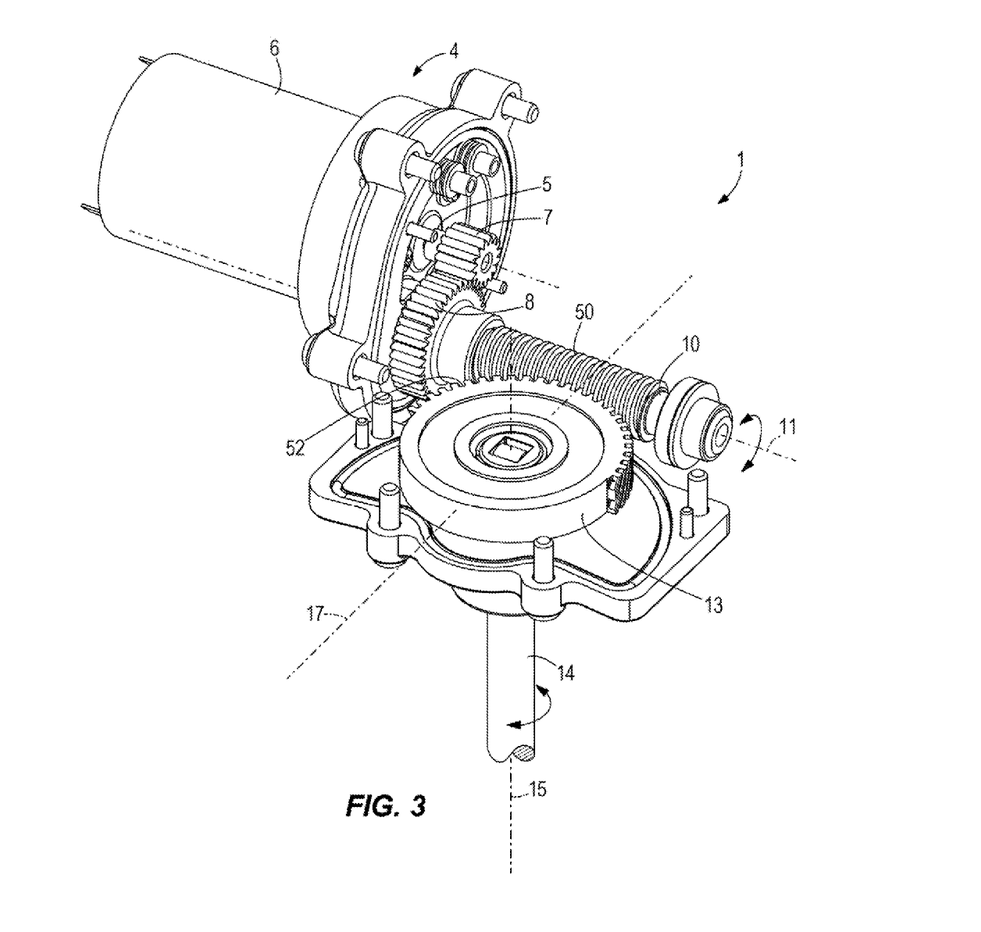
FIG. 3 depicts another embodiment of a shift actuation system for a marine drive.

FIG. 3 depicts another embodiment of the shift actuation system 1 that is similar to the embodiment of FIG. 2 except that a worm gear 13, or worm wheel, is fixed to the shift rod 14 instead of sector gear 12. The worm gear 13 has teeth 52 that mesh with the worm 50 to transfer rotational motion from the gear shaft 10 to the shift rod 14. Worm gear 13 may be any type of gear configuration capable of meshing with worm 50, including but not limited to a spur gear or helical gear configuration. Like the embodiment of FIG. 2, the shift rod 14 is oriented along third axis 17 and extends perpendicular to the gear shaft 10.

Figure 4:
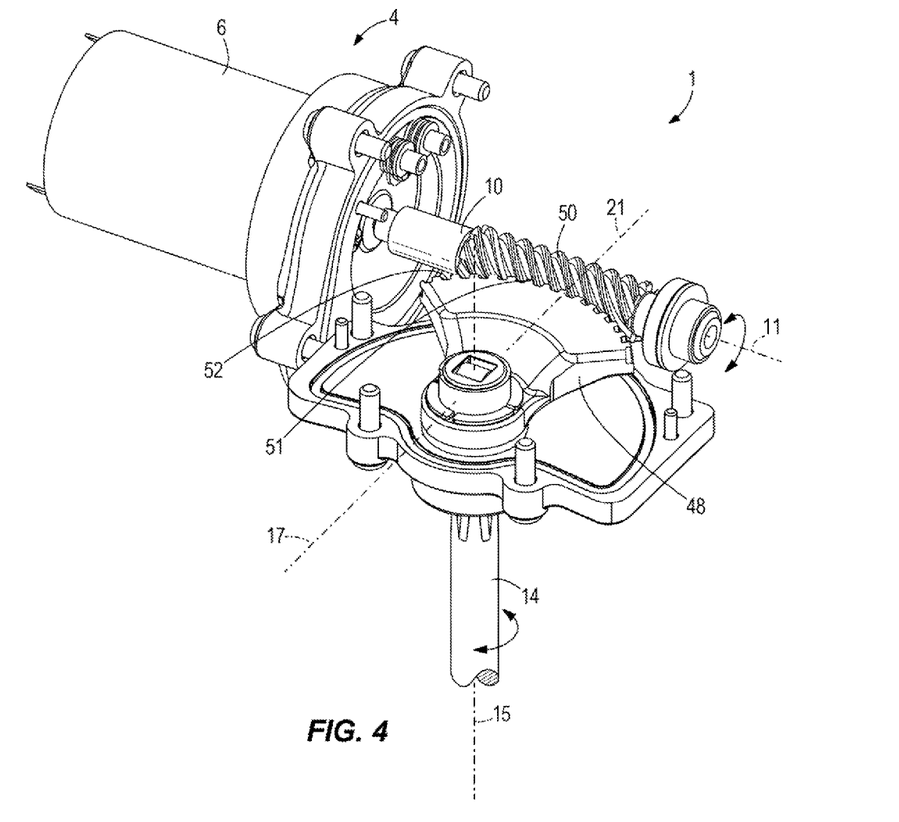
FIG. 4 depicts another embodiment of a shift actuation system for a marine drive.

FIG. 4 depicts another embodiment of a shift actuation system 1. In this embodiment, gear shaft 10 connects directly to motor 6 of actuator 4 such that the motor 6 acts directly on the gear shaft 10 causing it to rotate about its own axis, which is first axis 11. Similar to the embodiments of FIGS. 2 and 3, the gear shaft 10 has a worm 50 that engages a gear 48 fixed to the shift rod 14 such that rotation of the gear shaft 10 about first axis 11 causes rotation of shift rod 14 about second axis 15. Similar to the above-described embodiments, here the shift rod 14 extends perpendicularly to the gear shaft 10. The gear 48 may be, for example, a sector gear or a worm gear as described with respect to the embodiments above. The gear 48 has teeth 52 that mesh with the threading on the worm 50 to transmit rotational motion.

Figure 5:
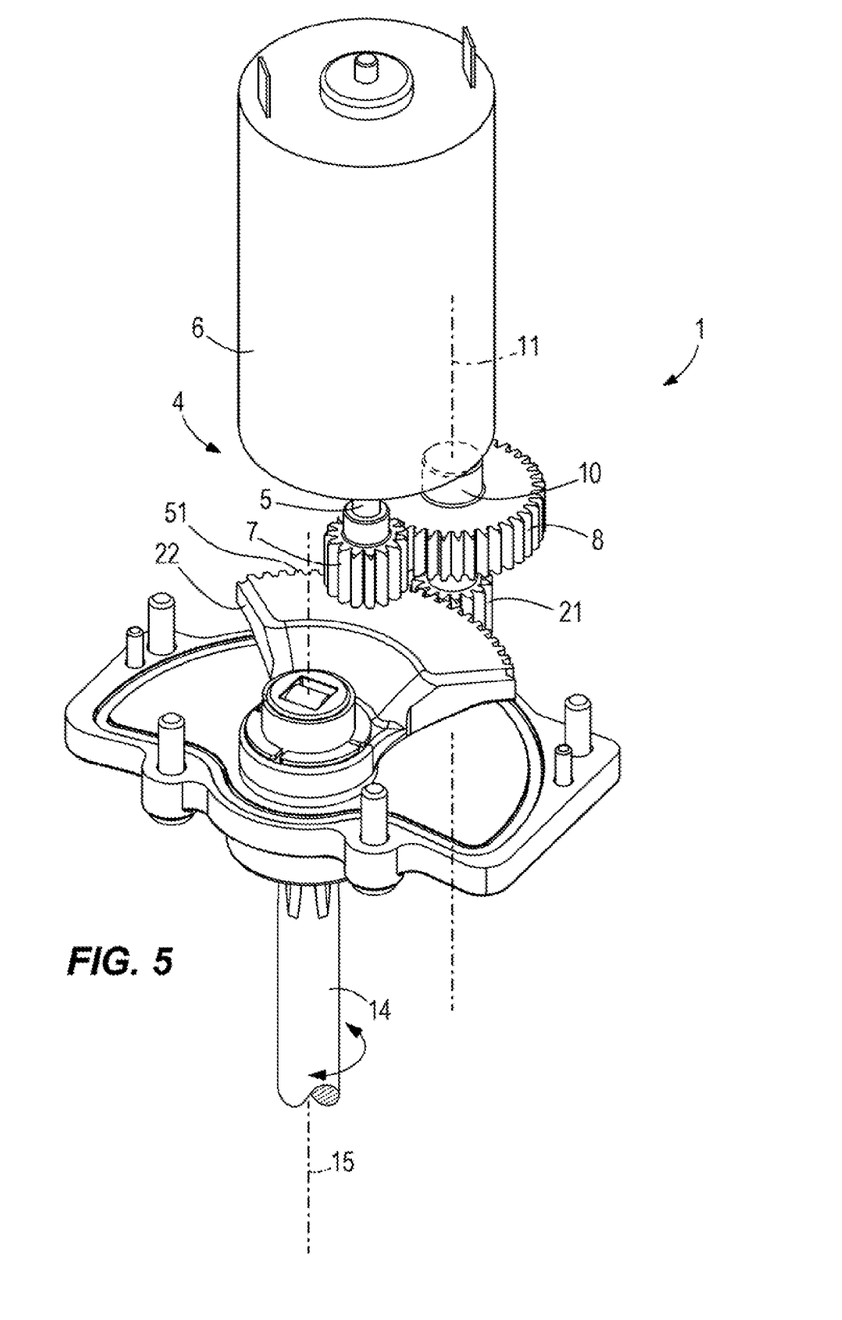
FIG. 5 depicts another embodiment of a shift actuation system for a marine drive.

In FIG. 5, an embodiment of a shift actuation system 1 has shift rod 14 that is parallel to gear shaft 10. More specifically, gear shaft 10 extends along first axis 11, which is parallel to axis 15 of the shift rod 14. The gear shaft 10 and the shift rod 14 are connected by a gearset comprising at least a third gear 21 fixed to the gear shaft 10 and a fourth gear 22 fixed to the shift rod 14. The output shaft 5 is connected to the gear shaft 10 by a gearset comprising first gear 7 and second gear 8, as is described above. The third gear 21 and the fourth gear 22 are parallel axis gears and may be, for example, spur gears or helical gears. The axes of third gear 21 and the fourth gear 22 also run parallel with the axes of the first gear 7 and the second gear 8. Furthermore, the third gear 21 and fourth gear 22 may be circular gears or sector gears.

Figure 6:
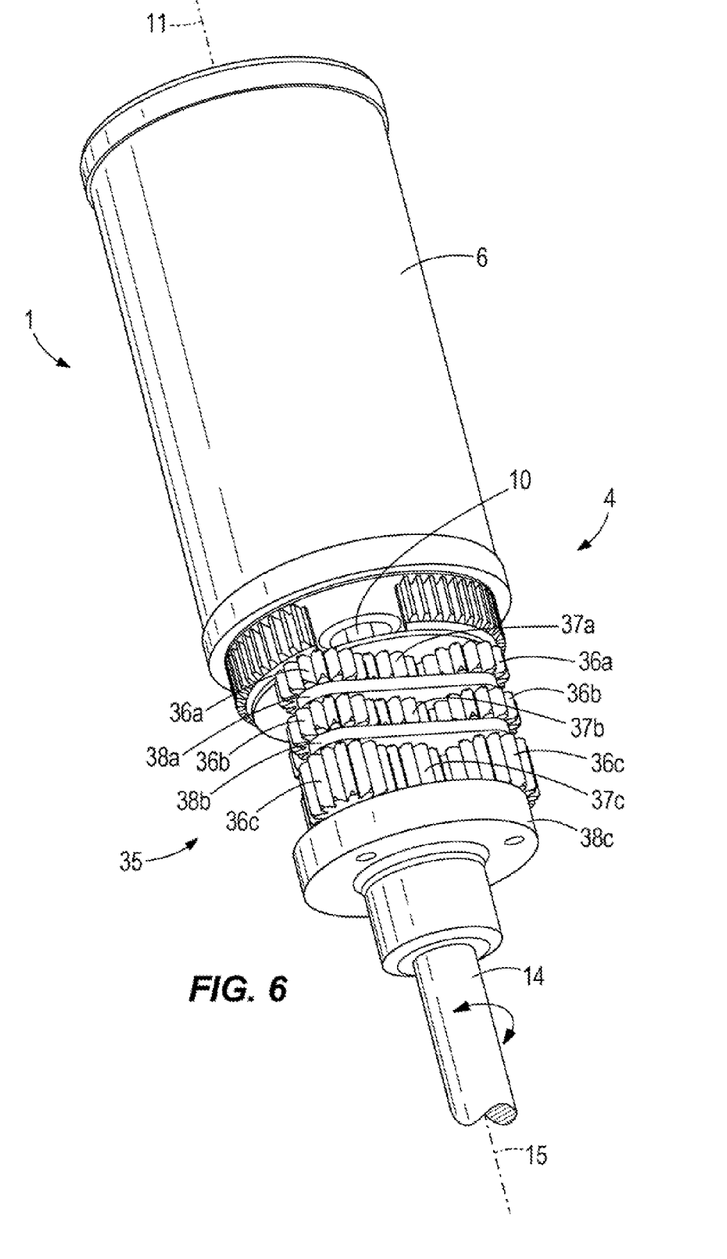
FIG. 6 depicts another embodiment of a shift actuation system for a marine drive.

In FIG. 6, an embodiment of a shift actuation system 1 has a shift rod 14 that is parallel to gear shaft 10. The gear shaft 10 extends directly from motor 6 of actuator 4 such that motor 6 acts directly on gear shaft 10 causing it to rotate about the first axis 11. The gear shaft 10 connects to the shift rod 14 through a planetary gearset 35. In a depicted embodiment, the planetary gearset 35 is a three-stage planetary gearset having three sun gears 37a-37c providing input to each stage of the planetary gearset 35. Each sun gear 37a-37c transfers motion through respective planet gears 36a-36c to a respective carrier 38a-38c. The carrier 38a-38c at each stage acts to transfer the rotational motion to the next stage with carrier 38c transferring rotation to the shift rod 14. The planetary gearset 35 of FIG. 6 also includes a stationary annular gear (not shown) surrounding the planet gears 36a-36c. For example, the annular gear may be fixed to a housing surrounding the planetary gearset 35.

Specifically, in the configuration of FIG. 6, rotation of the gear shaft 10 causes rotation of sun gear 37a causing planet gears 36a to rotate. Planet gears 36a are fixed to carrier 38a, and thus rotation of sun gear 37a causes the planet gears 36a and the carrier 38a to rotate, or orbit, at sun gear 37a. The sun gear 37b of the second stage is fixed to the carrier 38a such that rotation of the carrier 38a rotates the sun gear 37b. Rotation of the sun gear 37b, in turn, causes rotation of planet gears 36b and carrier 38b. Rotation of carrier 38b causes rotation of the sun gear 37c of the third stage, which then causes rotation of planet gears 36c and carrier 38c. Carrier 38c is fixed to the shift rod 14, and thus transmits the rotational motion from the planet gears 36c of the third stage to the shift rod 14. As will be understood by one of ordinary skill in the art, the planetary gearset 35 depicted in FIG. 6 provides one example of a planetary gear configuration and other planetary gearset arrangements may be employed to effectively transmit rotation from the gear shaft 10 to the shift rod 14.

Figure 9:
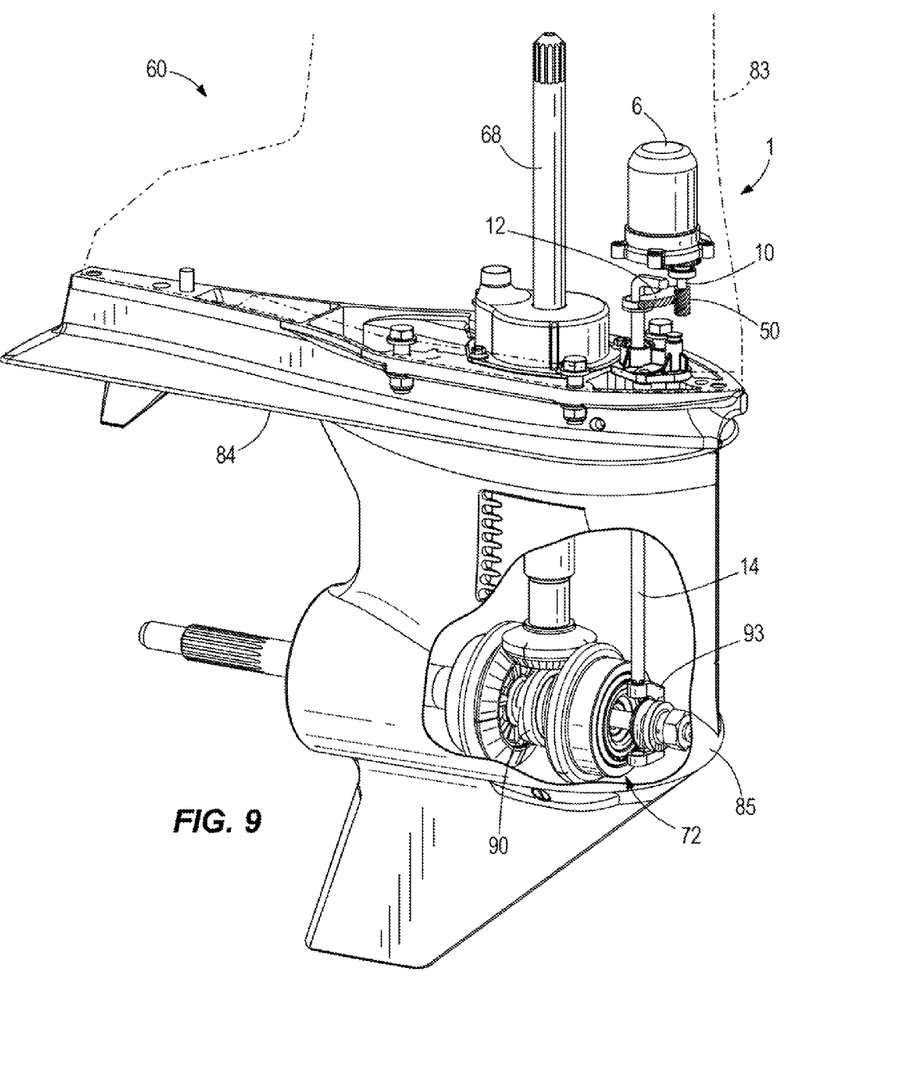
FIG. 9 depicts one embodiment of a shift actuation system incorporated into a marine drive.
Figure 10:
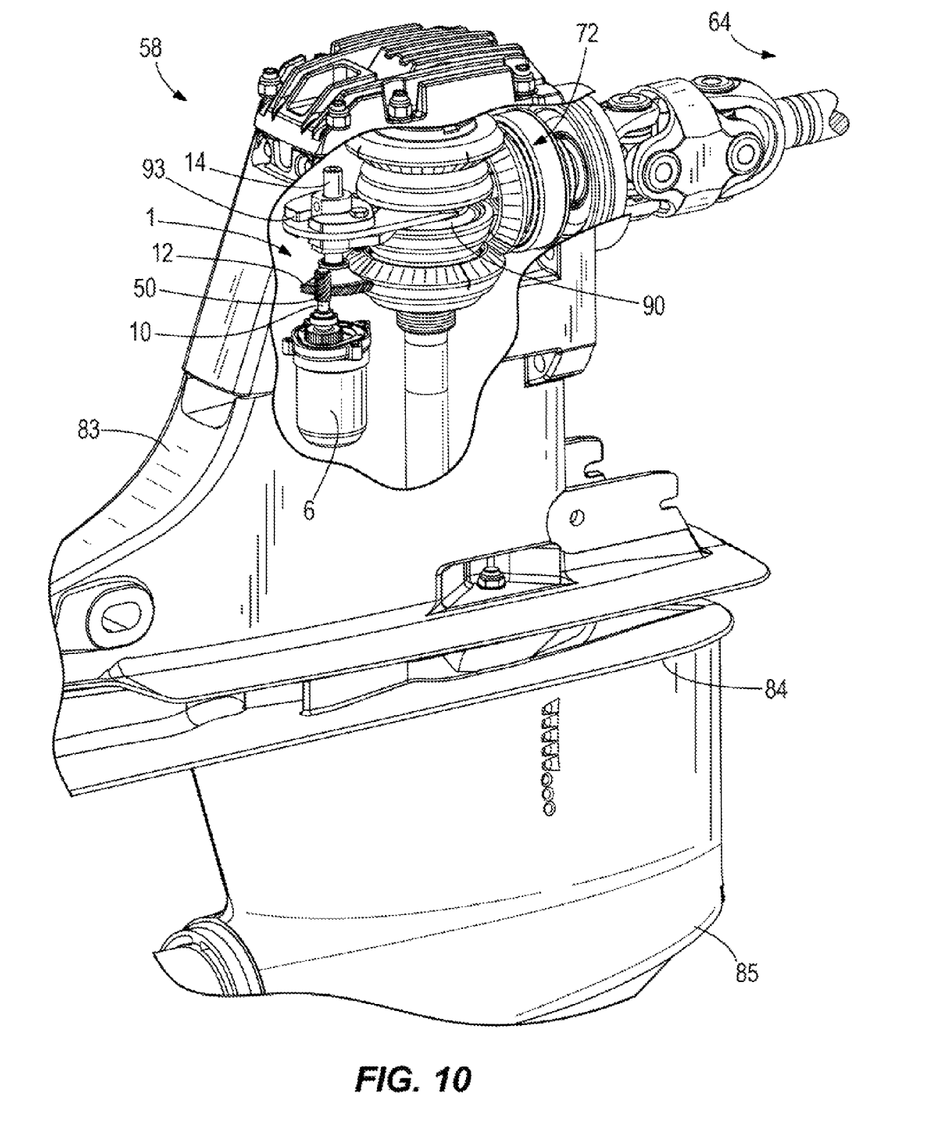
FIG. 10 depicts another embodiment of a shift actuation system incorporated into a marine drive.

FIGS. 1 and 7-10 depict embodiments of the shift actuation system 1 employed in marine drives. As described above with respect to FIG. 1, the shift actuation system 1 may be housed in the engine housing 81 near the internal combustion engine 66, which comports with the location of shift actuation system of currently available marine drives. Alternatively, the shift actuation system 1 may be housed in the driveshaft housing 83 and closer to the transmission 72. FIGS. 7-10 depict various embodiments having the shift actuation system 1 in the driveshaft housing 83. In FIG. 7, the shift actuation system 1 and the transmission 72 are housed in the driveshaft housing 83, and specifically in the bottom portion of the driveshaft housing 83 above the anti-ventilation plate 84. In the embodiment of FIG. 7, the shift actuation system 1 is located above the transmission 72, with the shift rod 14 extending down from the shift actuation system 1 to the transmission 72. In other embodiments, the shift actuation system 1 may be located next to or below the transmission 72. Thus, in alternate embodiments, the shift rod 14 may extend laterally between the shift actuation system 1 and the transmission 72. FIG. 10 provides one embodiment where the shift actuation system 1 extends below the transmission 72 with the shift rod 14 extending upwards to engage and cause shifting within the transmission 72.

FIGS. 8 and 9 depict an embodiment wherein the shift actuation system 1 is housed in a lower portion of the driveshaft housing 83 immediately above the anti-ventilation plate 84, with the transmission 72 housed in the gear case housing 85. The shift rod 14 extends between the shift actuation system 1 in the driveshaft housing 83 and the transmission 72 in the gear case housing 85. Referring to the embodiment shown in FIG. 9, the shift actuation system 1 is mounted in the driveshaft housing 83 directly above the anti-ventilation plate. The shift actuation system 1 comprises an actuator motor 6 that causes rotation of gear shaft 10. Gear shaft 10 has a gear fixed thereto that intersects with and engages a gear fixed to the shift rod 14. In the embodiment of FIG. 9, the gear shaft 10 has a worm 50 thereon that engages a sector gear 12 fixed to the shift rod 14 such that rotational motion of gear shaft 10 causes shift rod 14 to rotate in an opposite direction. In other embodiments, gear shaft 10 may have different gear engagement with shift rod 14, such as is shown and described above. In still further embodiments, the gear shaft 10 may be elongated and may extend from the driveshaft housing 83 through the anti-ventilation plate 84 and into the gear case housing 85. In such an embodiment, the shift rod 14 may be entirely contained within the gear case housing 85.

Shift rod 14 extends from its point of engagement with gear shaft 10 via the gearset 12, 50 to its point of engagement with the transmission 72 in the gear case housing 85. Specifically, the shift rod 14 terminates at shift mechanism 93 which comprises part of the transmission 72. Motion of the shift mechanism 93 due to the rotation of the shift rod 14 varies the engagement of the clutch 90 of the transmission 72 such that shifting occurs amongst a forward gear wherein the thrust is a forward thrust, a reverse gear wherein the thrust is a reverse thrust, and a neutral gear wherein the thrust is zero thrust. As is known in the art, the transmission 72 may include any clutch mechanism, including a dog clutch, cone clutch, and brake, or other type of friction clutch.

FIG. 10 depicts an embodiment having the shift actuation system 1 in the driveshaft housing 83 and positioned below the transmission 72, which is also in the driveshaft housing 83. The configuration of FIG. 10 depicts a stern drive 58 which connects to and extends from a marine vessel 64 having an internal combustion engine housed therein. The driveshaft housing 83 of a stern drive 58 extends directly or indirectly from the stern of the marine vessel 64. In the embodiment of FIG. 10, the actuator motor 6 acts directly on gear shaft 10 to cause gear shaft 10 to rotate about its own axis. Rotation of gear shaft 10 causes rotation of shift rod 14 through gearset 50, 12. Specifically, the embodiment of FIG. 10 has worm 50 on gear shaft 10 that engages sector gear 12 on shift rod 14 to transfer rotational motion. The rotation of gear shaft 14 causes shift mechanism 93 to vary engagement of the clutch 90 so as to effectuate shifting between forward, neutral, and reverse gears.

FIGS. 9 and 10 depict exemplary embodiments of the shift actuation system 1 in context of two different marine drives, and output marine engine 60 of a stern drive 58. Various embodiments of the shift actuation system 1 may be employed with equal effect, as is described above and exemplified in the FIGURES. In the embodiments of FIGS. 9 and 10, the axis of the gear shaft 10 runs parallel to the axis of the shift rod 14. In alternative embodiments, the gear shaft 10 may run perpendicularly to the shift rod 14 such as embodiments shown and described with respect to FIGS. 2-4. Likewise, the actuator motor 6 may act directly on the gear shaft 10, or may activate rotation of rotation of the gear shaft 10 through a gearset positioned between an output shaft 5 extending from the actuator motor and the gear shaft 10. Likewise, consistent with the embodiments described above, any gear configuration between the gear shaft 10 and the shift rod 14 may exist, including a worm gear configuration, spur gear configuration, a configuration of planetary gears, etc.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other assemblies. It is to be expected that various equivalents, alternatives and modifications are possible within the scope of the appended claims.

What is claimed is:

1. A marine drive comprising:
   an internal combustion engine that effectuates a rotation of a driveshaft;
   a propulsor driven into rotation by the driveshaft so as to effect a thrust;
   a transmission that shifts amongst a forward gear wherein the thrust is a forward thrust, a reverse gear wherein the thrust is a reverse thrust, and a neutral gear wherein the thrust is a zero thrust;
   a gear case housing on the bottom portion of the marine drive;
   a driveshaft housing around the drive shaft and positioned between the internal combustion engine and the gear case housing;
   a shift rod rotatable about its own axis, wherein rotation of the shift rod about its own axis shifts the transmission amongst the forward gear, the reverse gear, and the neutral gear; and
   an actuator motor positioned in the driveshaft housing that effectuates the rotation of the shift rod about its own axis.

2. The marine drive of claim 1 wherein the transmission is in the gear case housing and the shift rod extends between the driveshaft housing and the gear case housing.

3. The marine drive of claim 1 wherein the transmission and the shift rod are in the driveshaft housing and the actuator motor is positioned above the transmission.

4. The marine drive of claim 1 wherein the transmission is in the driveshaft housing and the actuator motor is positioned next to or below the transmission.

5. The marine drive of claim 1 further comprising:
   a gear shaft operably connected to the actuator motor such that the actuator motor causes the gear shaft to rotate about its own axis;
   at least one gearset connecting the gear shaft to the shift rod such that the rotation of the gear shaft about its own axis causes the rotation of the shift rod about its own axis.

6. The marine drive of claim 5 wherein the gear shaft and the gearset are in the driveshaft housing and the shift rod extends between the driveshaft housing and the gear case housing.

7. The marine drive of claim 6 wherein the actuator motor, the gear shaft, and the gearset are in a lower portion of the driveshaft housing above an anti-ventilation plate.

8. The marine drive of claim 5 wherein at least a portion of the gear shaft is in the gear case housing.

9. The marine drive of claim 5 wherein the actuator motor acts directly on the gear shaft to cause the gear shaft to rotate.

10. The marine drive of claim 5 further comprising an output shaft extending from the actuator motor and a gearset connecting the output shaft to the gear shaft.

11. The marine drive of claim 5 wherein the axis of the gear shaft is parallel to the axis of the shift rod.

12. The marine drive of claim 5 wherein the axis of the gear shaft is perpendicular to the axis of the shift rod.

13. A shift system for a marine drive, the marine drive having a driveshaft housing and a gear case housing, the shift system comprising:
- a transmission that shifts amongst a forward gear wherein the thrust is a forward thrust, a reverse gear wherein the thrust is a reverse thrust, and a neutral gear wherein the thrust is a zero thrust;
- a shift rod rotatable about its own axis to cause the transmission to shift amongst the forward gear, the reverse gear, and the neutral gear; and
- an actuator motor positioned in the driveshaft housing that effectuates the rotation of the shift rod about its own axis.

14. The shift system of claim 13 wherein the transmission is in the gear case housing and the shift rod extends between the driveshaft housing and the gear case housing.

15. The shift system of claim 13 wherein the transmission and the shift rod are entirely within in the driveshaft housing.

16. The shift system of claim 13 further comprising:
- a gear shaft operably connected to the actuator motor such that the rotary actuator motor causes the gear shaft to rotate about its own axis;
- at least one gearset connecting the gear shaft to the shift rod such that the rotation of the gear shaft about its own axis causes the rotation of the shift rod about its own axis.

17. The shift system of claim 16 wherein the axis of the gear shaft is parallel to the axis of the shift rod.

18. The shift system of claim 17 wherein the at least one gearset connecting the gear shaft to the shift rod is a planetary gearset.

19. The shift system of claim 17 wherein the at least one gearset connecting the gear shaft to the shift rod includes a worm on the gear shaft that engages a sector gear fixed to the shift rod.

20. The shift system of claim 16 wherein the axis of the gear shaft is perpendicular to the axis of the shift rod.

* * * * *